(12) United States Patent
Beaude et al.

(10) Patent No.: US 11,358,489 B2
(45) Date of Patent: Jun. 14, 2022

(54) SYSTEM FOR CHARGING ELECTRIC VEHICLES

(71) Applicant: ELECTRICITE DE FRANCE, Paris (FR)

(72) Inventors: Olivier Beaude, Paris (FR); Bayram Kaddour, Massy (FR); Bertrand Augustin, Versailles (FR); Julien Pennec, Massy (FR); Alban Jeandin, Le Plessis Robinson (FR)

(73) Assignee: ELECTRICITE DE FRANCE, Paris (FR)

( * ) Notice: Subject to any disclaimer, the term of this patent is extended or adjusted under 35 U.S.C. 154(b) by 178 days.

(21) Appl. No.: 16/470,436

(22) PCT Filed: Nov. 9, 2017

(86) PCT No.: PCT/EP2017/078745
§ 371 (c)(1),
(2) Date: Jun. 17, 2019

(87) PCT Pub. No.: WO2018/114127
PCT Pub. Date: Jun. 28, 2018

(65) Prior Publication Data
US 2020/0086756 A1 Mar. 19, 2020

(30) Foreign Application Priority Data
Dec. 19, 2016 (FR) .................................. 16 62726

(51) Int. Cl.
*B60L 53/67* (2019.01)
*H02J 3/14* (2006.01)
(Continued)

(52) U.S. Cl.
CPC ............... *B60L 53/66* (2019.02); *B60L 53/67* (2019.02); *B60L 53/68* (2019.02); *B60L 55/00* (2019.02);
(Continued)

(58) Field of Classification Search
CPC .......... B60L 53/66; B60L 53/67; B60L 53/68; B60L 53/30; B60L 53/14; B60L 53/00;
(Continued)

(56) References Cited

U.S. PATENT DOCUMENTS

| | | | |
|---|---|---|---|
| 2011/0001356 A1* | 1/2011 | Pollack | .................... H02J 3/381 307/31 |
| 2013/0204471 A1* | 8/2013 | O'Connell | .............. B60L 53/63 701/22 |

(Continued)

FOREIGN PATENT DOCUMENTS

WO 2014057133 A2 4/2014

*Primary Examiner* — Richard Isla
*Assistant Examiner* — Dung V Bui
(74) *Attorney, Agent, or Firm* — Faegre Drinker Biddle & Reath LLP

(57) ABSTRACT

A system for charging electric vehicles includes an optimization module configured to construct a charging profile representing a first charging power suitable for being supplied by the charging device in order to charge an electric vehicle, a regulation module for regulating the electric power supplied by the charging device. There is a first mode of operation in which the regulation module applies the charging profile and a second mode of operation in which the device supplies a second charging power. The system further includes a coordination device for communicating with the charging devices, which is suitable for triggering a coordinated optimization phase during which charging devices construct a charging profile from an individual charging data item and for triggering a coordinated regula- (Continued)

tion phase during which some of the charging devices implement the second mode of operation.

16 Claims, 4 Drawing Sheets

(51) Int. Cl.
  *H02J 7/00* (2006.01)
  *B60L 53/14* (2019.01)
  *B60L 53/30* (2019.01)
  *B60L 55/00* (2019.01)
  *B60L 53/66* (2019.01)
  *B60L 53/68* (2019.01)
(52) U.S. Cl.
  CPC .............. *H02J 3/14* (2013.01); *H02J 7/0027* (2013.01); *B60L 2260/54* (2013.01); *B60L 2260/58* (2013.01)

(58) Field of Classification Search
  CPC .. B60L 55/00; B60L 2260/54; B60L 2260/58; H02J 3/14; H02J 7/0027; H02J 7/00
  USPC ........................................................ 320/109
  See application file for complete search history.

(56) References Cited

U.S. PATENT DOCUMENTS

| | | |
|---|---|---|
| 2013/0307466 A1 | 11/2013 | Frisch et al. |
| 2014/0018969 A1* | 1/2014 | Forbes, Jr. ................ H02J 3/14 700/295 |
| 2014/0125280 A1 | 5/2014 | Sun et al. |
| 2014/0203077 A1* | 7/2014 | Gadh ................ H02J 13/00012 235/382 |
| 2016/0257214 A1* | 9/2016 | Miftakhov ............ H02J 7/0027 |

* cited by examiner

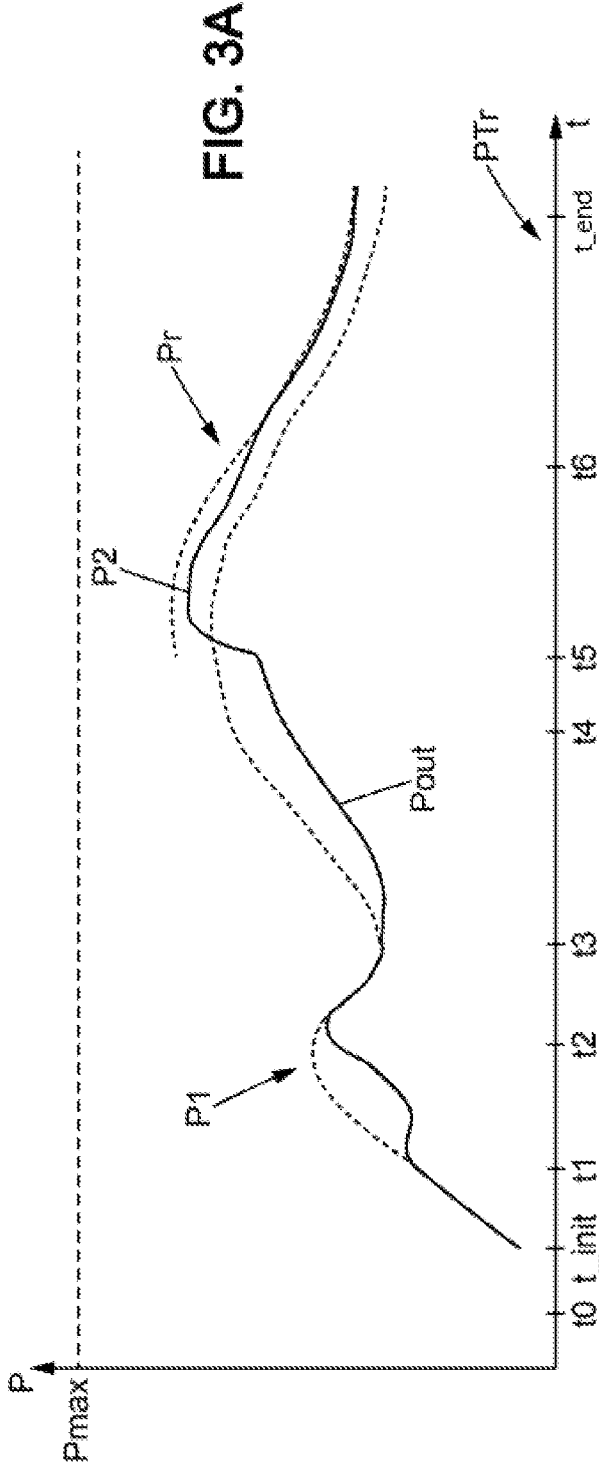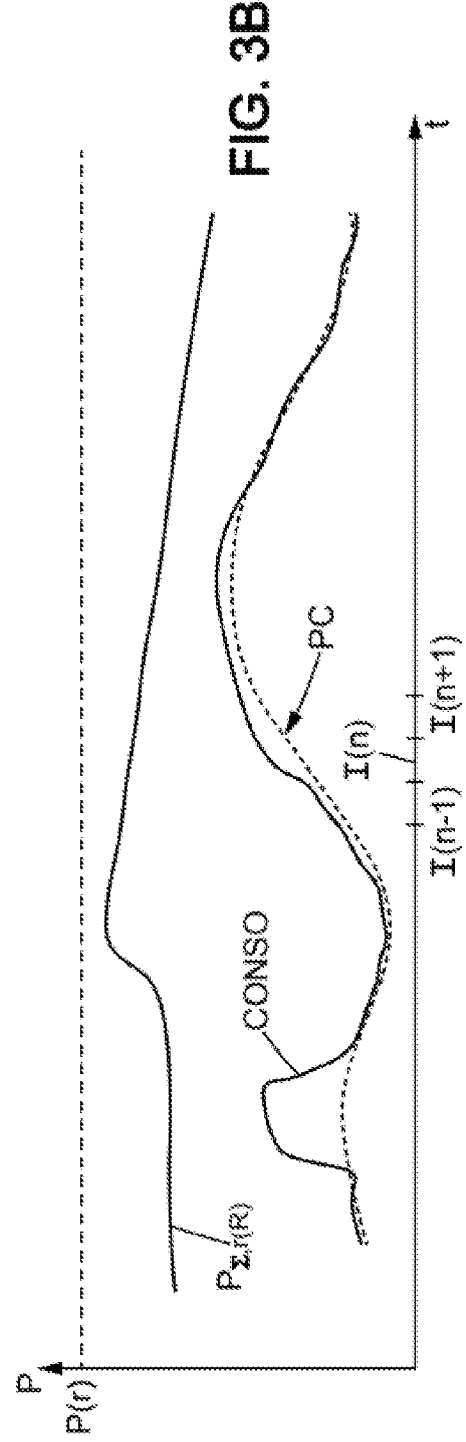

SYSTEM FOR CHARGING ELECTRIC VEHICLES

CROSS-REFERENCE TO RELATED APPLICATIONS

This application is the U.S. national phase of the International Patent Application No. PCT/EP2017/078745 filed Nov. 9, 2017, which claims the benefit of French Application No. 16 62726 filed Dec. 19, 2016, the entire content of which is incorporated herein by reference.

FIELD

The field of the disclosure relates to the charging of electric vehicles, and in particular to systems for charging a plurality of such vehicles.

BACKGROUND

With the growing size of the fleet of electric vehicles, the devices configured for charging such vehicles are themselves destined to increase their numbers substantially. However, the use of these charging devices can have a high impact on the power grid to which they are connected.

Indeed, the charging of an electric vehicle requires significant electric power, especially given the consumption of electricity by the other uses of a residential type of facility.

This impact is all the more marked when there is a large number of electric vehicles connected to the grid for charging.

In order to take this phenomenon into account, charging approaches have been developed in which the charging of a given electric vehicle is considered together with that of other vehicles.

However, the known approaches of this type have disadvantages.

Indeed, they are generally rigid, particularly in that they limit the amount and the nature of the phenomena to which the charging of a fleet of electric vehicles can be linked. The disclosure therefore aims to improve the situation.

SUMMARY

To this end, the disclosure relates to a system for charging electric vehicles, the system comprising:
a plurality of charging devices respectively adapted to supply regulated electric power in order to charge at least one electric vehicle with electrical energy, the charging devices being intended to be connected to an electric power supply grid, each charging device being intended to be connected to said grid via a point of delivery from which the charging device is configured to draw electrical energy in order to supply said regulated electric power, each charging device comprising:
an optimization module configured to construct a charging profile associated with a charging time slot and representative of a first charging power suitable for being supplied by the charging device during said charging time slot in order to charge the electric vehicle, and
a regulation module for regulating the electric power supplied by the charging device, the regulation module comprising:
a first mode of operation in which the regulation module is configured to regulate the electric power that is output in order to match said electric power to the first charging power during at least a portion of the associated charging time slot, and
a second mode of operation in which it is configured to regulate the electric power that is output in order to match it to a second charging power,
a coordination device for communicating with the charging devices, the coordination device being suitable for:
triggering a coordinated optimization phase involving a group of charging devices comprising some or all of the charging devices of said system and during which each charging device involved constructs a charging profile intended to be implemented in the first mode of operation at least based on an individual charging data item generated by the corresponding optimization module at least from predictions of power consumption of other electrical equipment items connected to the corresponding point of delivery for the charging time slot, and on a coordination signal generated by the coordination device from individual charging data items generated by some or all of the charging devices involved, and
triggering, at a given moment, a coordinated regulation phase involving some or all of the charging devices of the system, during which the regulation module of each of said charging devices involved in the coordinated regulation phase implements the second mode of operation, the corresponding second charging power being determined at least from status data of the electric power supply grid determined by the coordination device from measurements, representative of a grid status, made during at least one time interval preceding said given moment.

According to an embodiment, during the coordinated regulation phase, the charging devices involved are configured to implement a collective sub-mode of operation of the second mode of operation, the second mode of operation of the regulation module of each charging device further having an individual sub-mode of operation in which the second charging power is determined independently of said status data of the electric power supply grid determined by the coordination device from measurements, representative of a status of the grid, made during a time interval preceding said given moment.

According to an embodiment, in the individual sub-mode of operation, the regulation module is configured to determine the second charging power at least as a function of: power consumption data of other electrical equipment items connected to the corresponding point of delivery, measured during said time slot; and the first charging power of the charging profile.

According to an embodiment, for the charging devices involved in a coordinated optimization phase and having a charging profile in which the charging time slot comprises the start time of the coordinated optimization phase, the charging profile determined during the coordinated optimization phase replaces said charging profile once it is determined.

According to an embodiment, the optimization module of a charging device is configured to determine the individual charging data item additionally from at least one among the following:
a charging behavior of an electrical energy storage device of the electric vehicle that the charging device is intended to charge,
an electrical energy requirement of the electrical energy storage device of the electric vehicle, for charging said electrical energy storage device, an electricity pricing representative of a cost of the electrical energy to be supplied to the electrical energy storage device in order to charge it, an electrotechnical behavior of an electrical protection device of the associated point of delivery, a maximum electric power that the charging device is rated to deliver.

According to an embodiment, for the coordinated optimization phase, each regulation module is configured to generate the charging profile at the end of an iterative process in which each intermediate step comprises generating a temporary individual charging data item, sending said temporary individual charging data item to the coordination device, and receiving a temporary coordination signal generated by the coordination device based on the temporary individual charging data items from the various charging devices involved, the temporary individual charging data item being constructed as an individual charging data item from the previous step updated based on the temporary coordination signal received during the previous step, the charging profile being constructed from the constructed individual charging data item updated based on the coordination signal received during the last step or an intermediate step, the initial step being conducted based on the individual charging data item and the coordination signal.

According to an embodiment, the coordination device is configured to generate the coordination signal at least from an estimate of the impact on the power grid of the individual charging data items of the charging devices involved in the coordinated optimization phase.

According to an embodiment, the coordination device is configured to generate the coordination signal at least from the sum of the individual charging data items.

According to an embodiment, each individual charging data item is representative of a charging profile defining values of the first charging power over a charging time slot.

According to an embodiment, the coordination device is configured to trigger the coordinated regulation phase in response to at least one condition being satisfied of which at least one condition concerns a comparison between a capacity of a region of the electric power supply grid covering some or all of said power grid and a power consumption generated by the charging devices and the other electrical equipment items connected to said region.

According to an embodiment, the charging devices intended to be involved in said coordinated regulation phase are those connected to said region.

According to an embodiment, the coordination device is in the form of a device that is remote from the charging devices.

According to an embodiment, the coordination device comprises a plurality of coordination modules respectively coupled to one of the charging devices of the system, each coordination module being configured to communicate with the other charging devices of the system and to supply the coordination signal to the charging device with which it is associated.

The disclosure further relates to a method for charging a plurality of electric vehicles by means of a system comprising:

a plurality of charging devices respectively adapted to supply regulated electric power in order to charge at least one electric vehicle with electrical energy, the charging devices being intended to be connected to an electric power supply grid, each charging device being intended to be connected to said grid via a point of delivery from which the charging device is configured to draw electrical energy in order to supply said regulated electric power, each charging device comprising:

an optimization module configured to construct a charging profile associated with a charging time slot and representative of a first charging power suitable for being supplied by the charging device during said charging time slot in order to charge the electric vehicle, and a regulation module for regulating the electric power supplied by the charging device, the regulation module comprising:

a first mode of operation in which the regulation module is configured to regulate the electric power that is output in order to match said electric power to the first charging power during at least a portion of the associated charging time slot, and a second mode of operation in which it is configured to regulate the electric power that is output in order to match it to a second charging power, a coordination device for communicating with the charging devices, the method comprising:

performing a coordinated optimization phase involving a group of charging devices comprising some or all of the charging devices of said system and during which each charging device involved constructs a charging profile intended to be implemented in the first mode of operation at least based on an individual charging data item generated by the corresponding optimization module at least from predictions of power consumption of other electrical equipment items connected to the corresponding point of delivery for the charging time slot, and on a coordination signal generated by the coordination device from individual charging data items generated by some or all of the charging devices involved, and performing, at a given moment, a coordinated regulation phase involving some or all of the charging devices of the system, during which the regulation module of each of said charging devices involved in the coordinated regulation phase implements the second mode of operation, the corresponding second charging power being determined at least from status data of the electric power supply grid determined by the coordination device from measurements, representative of the grid status, made during at least one time interval preceding said given moment.

The disclosure further relates to a computer program comprising instructions for implementing the method as defined above when executed by a processor.

BRIEF DESCRIPTION OF THE DRAWINGS

Various embodiments of the disclosure are illustrated in the drawings, in which:

FIGS. 3A and 3B are schematic illustrations of quantities considered during a charging time slot;

DETAILED DESCRIPTION

Figure 1:
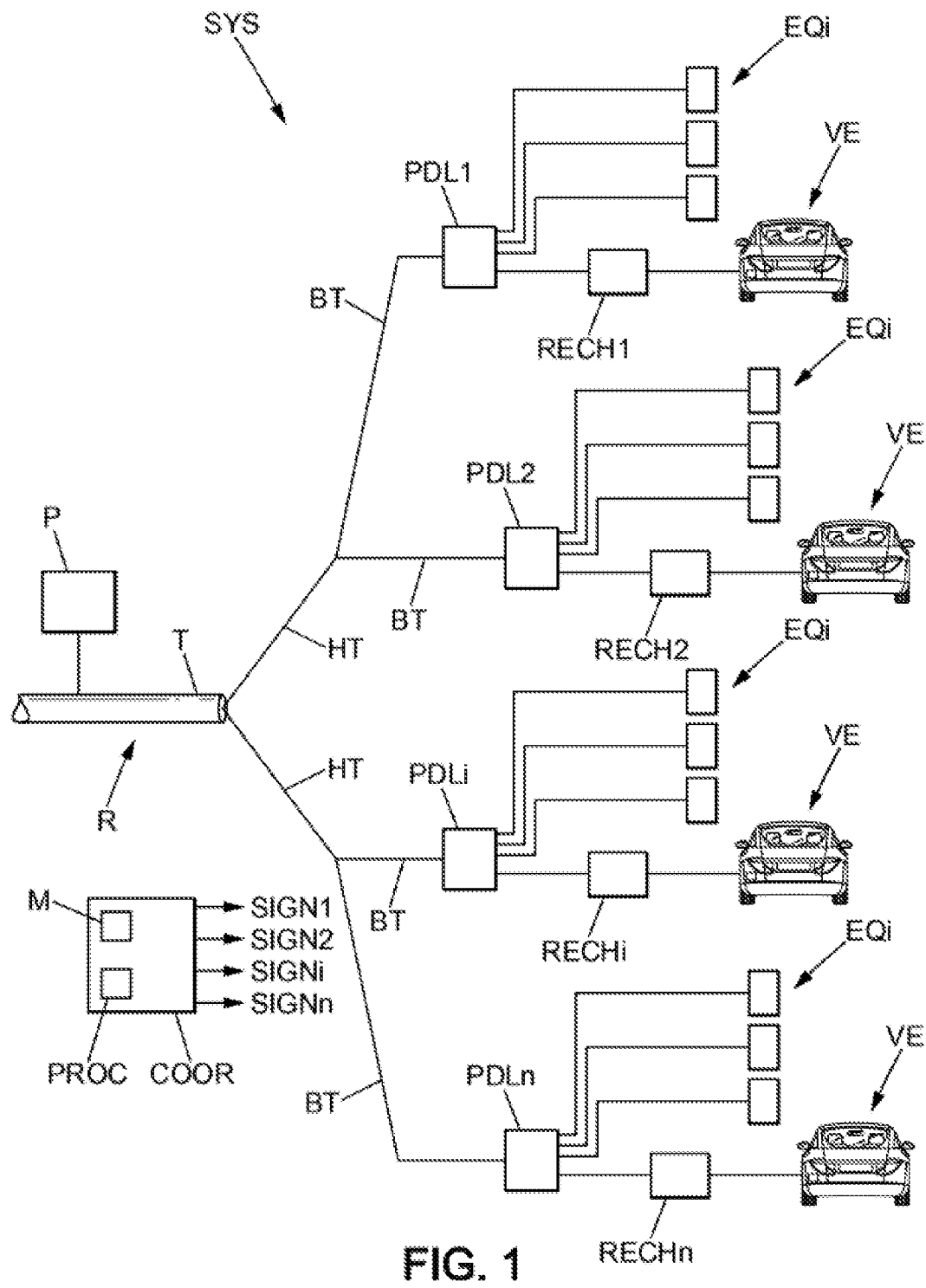
FIG. 1 is a schematic illustration of a system according to an embodiment.

FIG. 1 illustrates a system SYS according to an embodiment. The system SYS is suitable for charging electric vehicles VE, in particular for simultaneously charging a plurality of vehicles VE.

Each electric vehicle VE is configured for self-propulsion wholly or in part by electrical energy. For this purpose, each vehicle VE comprises a storage device STO for storing electrical energy and supplying it to at least one propulsion unit (not shown) of the vehicle VE in order to ensure the propulsion of the vehicle at least by electrical energy. Note that this propulsion may also be provided wholly or in part from gasoline or diesel fuel. Each vehicle further comprises a plug or socket adapted to be connected to a socket or plug of complementary shape of a charging device of the system SYS, described below, in order to transfer electrical energy between the vehicle and the charging device considered, in particular to charge the storage device STO with electrical energy.

The system SYS is intended to be connected to an electrical power supply grid R through which electrical energy is transported, and in particular conveyed to the system SYS in order to charge the vehicles VE.

The grid R is connected to at least one electricity production facility P configured to generate electrical energy and inject this electrical energy into the grid R for use by users connected to the grid.

The grid R considered in the context of the disclosure covers any area. For example, it may be a grid at the level of the neighborhood, city, region, country, or even continent.

The grid R comprises a transmission portion T, a medium-voltage portion HT, and a low-voltage portion BT. In known manner, the medium-voltage HT and low-voltage BT portions together form a distribution portion of the grid.

The transmission portion T forms a general component of the grid R which enables the transmission of electricity over great distances. The low-voltage portion BT forms a local component of the grid through which the users are connected to the rest of the grid R. The medium-voltage portion HT typically forms a junction component between portion BT and the transmission portion T.

These portions (the grid R in general) define nodes of the grid which are connected to each other by grid segments. The nodes include, for example, one or more pieces of equipment adapted to convert electrical energy from one given format to another (for example, differing from each other at least in the voltage values). The segments include wiring for example.

The grid, its portions, its nodes, and the segments between the nodes have a given rating, which results for example in the existence of capacities of these various elements, particularly in terms of permissible electric power, permissible intensity, and permissible voltage.

Note that in FIG. 1, the medium-voltage portions HT are illustrated as all being connected to the transmission portion by the same node. However, in the context of the disclosure, this may not be the case. In particular, the low-voltage and medium-voltage portions involved may be geographically distant and correspond to different regions of the same country.

With reference to FIG. 1, the system SYS according to the disclosure comprises a plurality of charging devices RECH and a coordination device COOR.

Each charging device RECH is suitable for charging at least one vehicle VE with electrical energy. For this purpose, it is configured to draw electrical energy from the grid R and provide regulated electric power for charging this vehicle VE.

Figure 2:
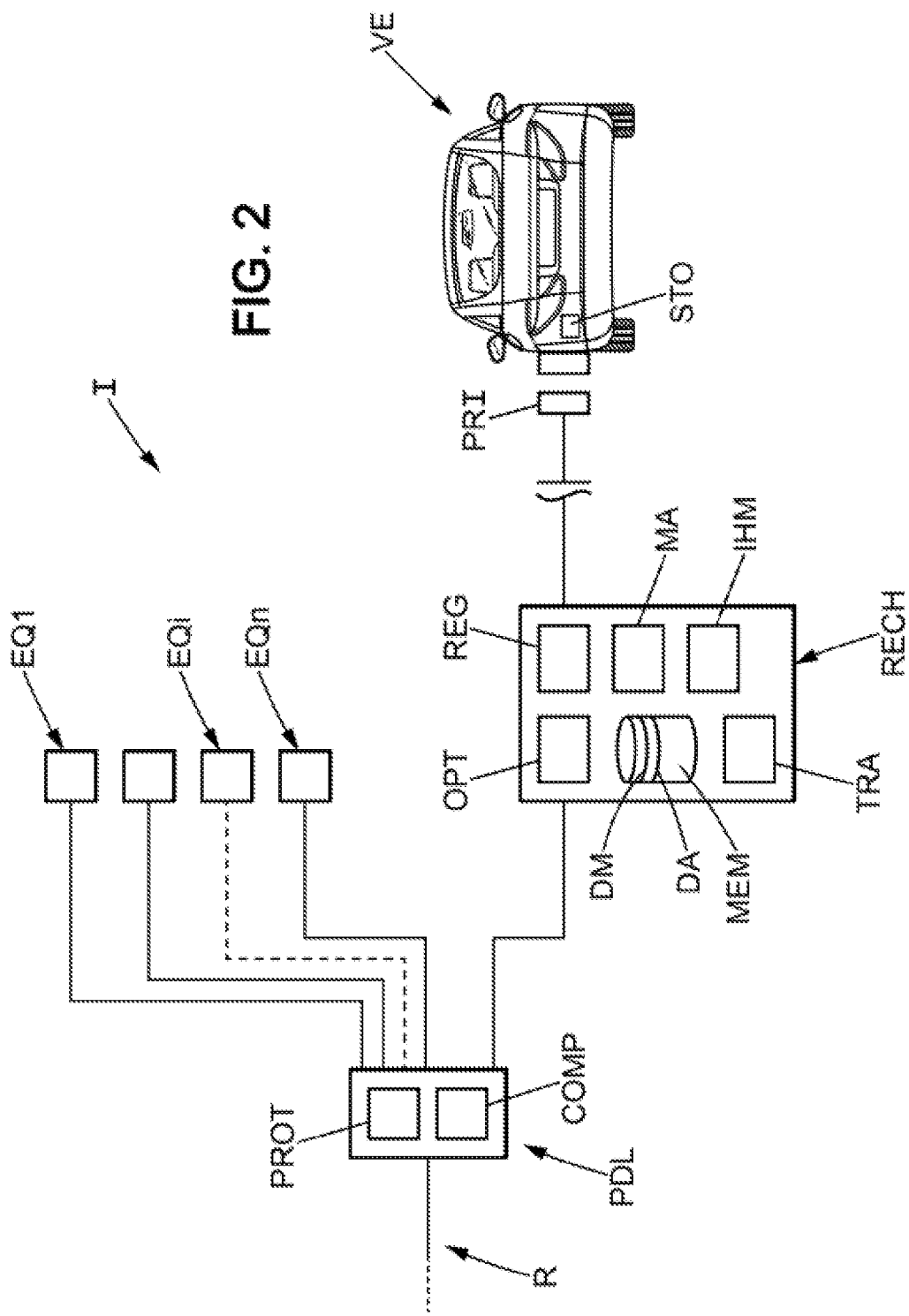
FIG. 2 is a schematic illustration of a charging device of the system of FIG. 1.

Referring to FIG. 2, each charging device RECH is connected to the grid R by a point of delivery PDL to which are also connected electrical equipment items EQi configured to draw electrical energy from the grid R.

The equipment items EQi and the charging device RECH are part of a facility I. This facility corresponds for example to a place of residence. For example, the equipment items EQi are installed at least partially inside a home. The charging device is for example arranged outside.

Alternatively, this facility is some other type of location such as a place of commerce or a business. The facility comprises, for example, a parking lot with the charging device arranged within it or at the edges.

In general, the disclosure can be applied regardless of the type of facility I.

Preferably, the equipment items EQi and the charging device constitute the set of elements capable of drawing electrical energy at the point of delivery. In other words, only the equipment items EQi and the charging device RECH are able to extract electrical energy at the point of delivery PDL.

The point of delivery PDL is intended to supply electrical energy to the equipment items EQi and to the device RECH.

In practice, the point of delivery PDL corresponds to the connection interface between the grid R and the electrical component of the facility I to which the equipment items EQi and the device RECH belong. It comprises for example one or more electrical equipment items configured to establish this connection.

For example, the point of delivery PDL comprises a metering device COMP for measuring the electrical energy and/or the electric power drawn at the point of delivery by the equipment items EQi and the device RECH.

Advantageously, the metering device COMP is configured to measure at least the electric power and electrical energy drawn by these elements over time. One will note that the metering of the electric power can be done on the basis of metering the electrical energy in relation to units of time.

Advantageously, the metering device COMP is adapted to categorize the electrical energy drawn at the point of delivery PDL into types of use and to measure the consumption for each of these uses. These uses each correspond to a type of activity among a predetermined set.

For example, for a residential facility I, these uses include heating the facility I, cooling the facility I, producing domestic hot water, lighting the facility I, a cooking use which corresponds to using electrical energy for cooking, a washing use which corresponds to using electrical energy for washing, so-called "brown goods" use which corresponds to using electrical energy to operate household appliances such as televisions, etc.

Note that this categorization into types of use is optional.

In addition, the metering device COMP is configured to communicate with the associated charging device RECH, in particular in order to supply data representative of the consumption, for example of power, by the equipment items EQi and collected by it over time. Note that the data communicated at a given moment are relative to a moment immediately preceding that moment, and/or relating to more distant moments.

In addition, the metering device COMP is configured to communicate with the coordination device COOR, in particular to provide it with the measurements made. Any suitable technology for doing this, such as Powerline Communication (PLC) technology, may be employed.

The point of delivery PDL advantageously further comprises a protection device PROT configured to protect the electrical facility defined by the equipment items EQi and the device RECH and the elements connecting them to the point of delivery. This protection device PROT advantageously comprises a cutoff member. Note that this cutoff member may be hardware, comprising for example a circuit breaker, and/or software.

Note that this protection device PROT is optionally integrated into the metering device, at least in part.

In the context of the disclosure, the point of delivery PDL is configured to deliver a maximum electric power, denoted Pmax. This maximum power is for example determined as a function of the power draw subscribed to with a supplier for the point of delivery. This power Pmax is for example less than or equal to 36 kVA.

As previously indicated, the equipment items EQi are configured to operate at least in part by using electrical energy.

These equipment items EQi correspond for example to conventional items equipping a place of residence, such as radiators, lighting, household appliances, an oven, stove burners, a water heater, etc. Another possible type of equipment relates to servers, for example data servers, which are for example gathered in structures commonly called data centers.

As mentioned above, the charging device RECH is specifically designed to charge the electric vehicle VE with electrical energy using the electrical energy it draws at the point of delivery PDL. In particular, it is intended to provide the vehicle VE with regulated electric power Pout.

In addition, it is configured to communicate with the point of delivery PDL, in particular the metering device COMP, the electric vehicle VE, and the coordination device COOR. These communications are for example implemented by any known means, such as the Internet, ZigBee, WiFi, or a wired means, particularly a pilot wire for communications with the vehicle.

The device RECH comprises a plug or socket PRI, a memory MEM, and a processing module TRA. In addition, it comprises an optimization module OPT, a regulation module REG, and a learning module MA. Advantageously, it further comprises a human-machine interface, hereinafter the interface IHM.

The plug or socket PRI is intended to be connected to the electric vehicle VE in order to connect it electrically to the charging device, to charge the electric vehicle. For this purpose, the vehicle itself comprises a socket or plug of complementary shape intended to engage with the plug or socket PRI, as indicated above.

The plug or socket PRI is for example of known style. It is for example in the form of a female socket, the male plug being carried by the vehicle.

The memory MEM comprises programs whose execution by the processing module TRA enables the charging device to operate.

Advantageously, it further comprises training data DA described below.

In addition, it advantageously comprises measurement data DM. These measurement data are representative of the measurements, in particular of electric power, drawn by the equipment items EQi over time. These data define in particular a power curve CONSO (FIG. 3B) representative of the electric power drawn by the equipment items EQi at the point of delivery over time.

These data are constructed from the consumption data generated by the metering device and sent to the device RECH, for example at a regular frequency. These data include, for example, the consumption curve of the point of delivery that does not include consumption due to charging the electric vehicle.

Note that the memory MEM may correspond to a plurality of separate storage memories, for example such as one or more volatile memories and/or one or more non-volatile memories. The various data are for example distributed between these separate memories.

The processing module TRA is configured to control the various elements of the charging device RECH so that they operate properly.

The processing module TRA comprises for example one or more processors.

In the example of FIG. 1, the optimization module OPT, the regulation module REG, and the learning module MA have been represented as dedicated modules. In practice, they may take any form. In particular, they may be software, hardware, or comprise a software component and a hardware component.

For example, the optimization module OPT comprises a software component stored in memory MEM and whose execution by the processing module TRA results in implementing the functionalities described below.

The same is true for the regulation and learning modules. For the regulation module, it advantageously comprises a hardware regulation device, comprising for example one or more converters configured to output the regulated electric power supplied by the charging device RECH.

With reference to FIGS. 2, 3A, and 3B, the optimization module OPT is configured to construct a charging profile Pr associated with a charging time slot PTr. The charging profile Pr is representative of a first charging power P1, or first power P1, adapted to be output from the device RECH to the vehicle VE during the slot PTr in order to charge it. In other words, for each given moment of the charging time slot PTr, the charging profile is defined by the power P1 at that moment, this power P1 in principle varying over time.

The slot PTr corresponds to the time slot during which the electric vehicle is charged. This slot begins at time t_init and ends at time t_fin.

Time t_init is for example defined according to the moment the vehicle VE is connected to the charging device. For example, it corresponds to this moment.

Advantageously, it is later than this moment. More specifically, it advantageously corresponds to the moment when the charging device begins to send electrical energy to the vehicle in order to charge it. The time interval between plugging in the vehicle and this moment is for example used to implement an initial step of charging device preparation, described below, during which a charging profile Pr is constructed. Note that this preparation may also be implemented, or at least begin, before the moment the vehicle is plugged in, for example when the vehicle is supposed to provide information remotely to the charging device, concerning its electrical energy requirements.

Time t_fin corresponds to the moment when the charging of the vehicle VE is considered complete. In practice, from that moment on, electric power is no longer supplied to the vehicle for charging, and this is true until it is disconnected from the plug or socket PRI.

Time t_fin is for example known prior to time t_init. In this case, time t_fin is, for example, predetermined on the basis of information received by the charging device RECH. This information comes for example from the vehicle VE itself, or is entered by a user, for example via the interface IHM.

Alternatively, this moment is determined, for example by the optimization module OPT. Indeed, this moment is for example an element of the result of the process of constructing the charging profile.

The charging slot PTr is for example subdivided into consecutive intervals I(nl), I(n), I(n+1) taken into account in the operation of the charging device RECH.

These intervals are for example regular (in other words all having the same duration), their duration being for example about a second. Alternatively, these intervals are not all of the same duration. For example, in a first mode of operation of the device described below, they have a regular duration, for example of an order of magnitude of about a minute. In a second mode of operation, they are for example also regular, with a duration for example of about a second.

The charging profile PTr has for example a continuous piecewise configuration. For example, the profile defined for each interval considered has a constant single value for power P1 throughout this interval.

Several approaches are possible for constructing the profile. In a first case, in which the charging device RECH proceeds in a manner decoupled from the other charging devices RECH of the system, the charging profile is constructed independently of the coordination device and of information relating to the grid R and the other charging devices (this information is detailed below).

In a second case, this construction takes into account information transmitted by the coordination device and referring to other charging devices and/or the status of the grid R.

As described in more detail below, the determination of the charging profile according to the approach of the first case is advantageously used when constructing the charging profile according to the second case. More specifically, the charging profile of the first case is used as the starting element when constructing the profile according to the second case.

In general, the charging profile Pr is constructed at least on the basis of predictions of the power consumption PC (FIG. 3B) of the equipment items EQi which are able to draw electricity at the point of delivery PDL with which the charging device RECH is associated. These predictions cover at least a portion of the time slot PTr, and advantageously the entire time slot PTr.

The consumption predictions are established before the beginning of the charging time slot PTr.

These predictions advantageously correspond to the cumulative consumption predictions for the various equipment items EQi, and thus define the expected behavior of the only elements likely to draw electrical energy at the point of delivery aside from the device RECH.

For example, these predictions are in the form of electric power varying over time.

These predictions are for example determined in a known manner, for example from a GAM model, which is the acronym for "Generalized Additive Model".

For example, they are based on the measurement data DM, which define a consumption history of the equipment items EQi. Advantageously, they are more specifically established from measurement data corresponding to time blocks covering those of the charging time slot PTr. For example, these predictions are based on predictions for each type of use associated with the point of delivery PDL. These predictions by type of use are, for example, determined from the measurement data DM, which can represent the consumption of the different types of use of the equipment items EQi over time.

Advantageously, the predictions made at a given moment are determined at least on the basis of the measurement data DM concerning the consumption of the equipment items EQi concerning a period of time immediately preceding that moment. In other words, the most recent consumption data are taken into account when constructing predictions.

The charging profile Pr is also determined on the basis of the maximum power Pmax that the point of delivery can deliver.

Advantageously, in other words optionally but in an advantageous manner, the charging profile Pr is further determined as a function of at least one of the following:
a charging behavior of the storage device STO of the electric vehicle,
the electrical energy requirement of the storage device STO of the electric vehicle, in order to charge it,
pricing for the electrical energy supplied by the point of delivery PDL in order to charge the vehicle,
the electrotechnical behavior of the protection device PROT of the point of delivery PDL,
a power capacity of the charging device RECH, in other words a maximum power that the charging device RECH is rated to deliver.

The charging behavior of device STO is representative of the operation of the storage device when charging. This behavior comprises, for example, considerations relating to one or more constraints concerning the electric power received, such as its value relative to a lower bound to be exceeded and/or an upper bound not to be exceeded, or to variations in power over time that are not to be exceeded. This behavior may alternatively or in parallel include a consideration relating to the number of times that charging is observed to be stopped during the period PTr, which is for example to be kept below a predetermined value.

In practice, this charging behavior of device STO is representative of the charging characteristics of the storage device STO which it is preferable to observe in order to avoid damaging it.

The energy requirement of the storage device STO corresponds to a charge status of the storage device prescribed for the vehicle's autonomy requirement. This requirement is for example related to the amount of electrical energy stored in device STO when it is connected to device RECH, as well as the desired amount of electrical energy at the end of charging. Note that the final charge status does not necessarily correspond to a complete charge of the storage device STO.

This desired amount of electrical energy at the end of charging is for example provided to the device RECH, for example by the user via the interface IHM or the vehicle VE. Alternatively, it is estimated, for example by the optimization module or by any other equipment of the charging device RECH, such as a dedicated module. This estimate is for example constructed from the usage data of the vehicle. These usage data are for example provided by the vehicle to the device RECH, which stores them in memory MEM. For example, these data include a history of trips made with the vehicle. This history comprises or is for example determined from GNSS ("Global Navigation Satellite System") positioning data representative of the locations of the vehicle over time, and which the device RECH obtains from the vehicle VE.

In practice, the electrical energy requirement of the charging device is for example in the form of a charge status to be reached at the end of the time slot PTr.

The electricity pricing is representative of the cost of the electrical energy drawn or to be drawn at the point of delivery in order to charge the electric vehicle. In other words, it is the price of charging the vehicle with electricity, which the device RECH is intended to perform. In a known manner, this price (i.e. the tariff) is determined from the unit cost associated with a unit of electricity measurement, typically one kilowatt-hour (kWh). However, in a known manner, this unit of electricity measurement is associated with a price, for example euros per kilowatt-hour, which may differ from one time slot to another.

For example, the pricing is determined from data stored in the memory which include time-of-use pricing indices, adapted to be matched with price data for example provided by a remote device. One will note that these pricing indices can be updated, for example regularly or when triggered by external equipment.

The electrotechnical behavior of the protection device PROT is representative of the operation of this device as a function of the power drawn at the point of delivery PDL, and in particular of the conditions for switching between a state where it allows energy to be drawn at the point of delivery by the charging device and the equipment items EQi, and a state where it prevents this, in particular in order to protect the facility I.

For example, the protection device PROT may be configured to allow exceeding the maximum power Pmax for a short period of time (corresponding to a predetermined number of intervals I(n)), but switches to a state that no longer allows the drawing of energy after this period of time. Note that the period of time considered is for example predetermined on the basis of the amplitude by which Pmax is exceeded.

In practice, this behavior models the response of the protection device to events concerning the safety of the electrical component of the facility I.

Advantageously, the optimization module OPT is configured to determine the charging profile Pr as an optimal solution of an optimization problem with at least one objective and at least one constraint.

The term "objective" means the quantity to be minimized in the optimization problem. "Constraint" means a condition to be satisfied by the solution to the problem.

The selected objectives and constraints differ according to whether one is in the first case or the second case.

In the context of the first case, for example, the objective or objectives are chosen from: the cost (price) associated with charging the electric vehicle, the maximum value of the electric power drawn at the point of delivery while charging the vehicle (in other words the highest value reached by the cumulative power required to supply the equipment items and to charge the vehicle by the device RECH during the period PTr), and completion of the charging of the vehicle VE as soon as possible.

Advantageously, these three objectives are taken into account, the charging profile according to the first case then being constructed as an optimal solution of a problem of minimizing: the maximum value of the electric power drawn at the point of delivery by the charging device and the other equipment items for the charging time slot, a total cost of the electrical energy to be provided by the point of delivery for the charging time slot, and the end of charging time.

In general, the constraint or constraints according to the first case are advantageously chosen from: the maximum power Pmax, as exceeding this is to be prevented (or at least limited); the electrical energy requirement of the vehicle, which dictates the total amount of energy supplied to the vehicle during the slot PTr, and the charging behavior of the storage device STO, which aims to prevent a charging of the device STO that is likely to damage it. Any combination of these constraints may be retained.

One will note that exceeding the power Pmax may be authorized as long as such an overrun occurs under conditions that do not switch the protection device to its cutoff configuration that disallows drawing from the point of delivery.

In the context of constructing the charging profile according to the second case, advantageously at least one additional objective and/or at least one additional constraint is selected.

The additional objective or objectives are advantageously chosen from:

the maximum cumulative electric power across all electric vehicles charged or to be charged by some or all of the charging devices RECH of the system SYS;

an impact on the status of the grid of the charging carried out or to be carried out by some or all of the charging devices RECH.

As described in more detail below, the charging devices considered for each of these objectives are those involved in the so-called coordinated optimization phase (described below) resulting in the construction of a charging profile according to the second case for all these charging devices.

Advantageously, the additional constraint corresponds to a constraint relating to the grid R, for example to the low-voltage portion BT connecting the associated point of delivery PDL with the rest of the grid R (but not necessarily the low-voltage network). This constraint is for example a voltage (or a plurality of voltages), an electrical intensity or electric power defining one or more upper and/or lower bounds not to be crossed, or a frequency. These elements can be viewed as power grid capacities.

For example, a given constraint relates to the value of such a capacity for an element of the grid, or to the value associated with a set of grid equipment forming a region. This region may or may not coincide with a given portion.

For example, a power constraint may relate to a given node.

Note that advantageously, one or more constraints relate to a set of nodes called pilot nodes. These nodes are selected within the grid and define reference points of the grid. For example, these nodes are chosen so that satisfying a constraint associated with these nodes is considered to be representative of the entire grid satisfying this constraint.

The constraints from which the selection is made include for example: a frequency associated with the grid in its entirety, one or more voltages associated with a given equipment item or set of equipment items, an intensity associated with the low-voltage portion BT of the grid, a electric power associated with one or more nodes (for example pilot nodes), etc.

As for the details of constructing the charging profile, in particular in the first case, this construction advantageously relies on a multi-criteria approach.

For example, associated with the problem is a metric defined from several sub-metrics respectively associated with one of the objectives. Each sub-metric is weighted by a factor of chosen form. The metric is for example defined as a combination, for example linear, of different sub-metrics.

Each sub-metric has for example a value corresponding to the associated objective, for example the pricing, the end of charging time, the value of the maximum power reached during the time slot.

The charging profile is determined from the data of the problem modeled in this manner, for example using the resolution technique of integer linear programming (acronym ILP).

Alternatively, a hierarchical method (sometimes known as the epsilon-constraint method) may be used, in which each sub-metric is considered sequentially. In this context, one or more constraints are added for example on the sub-metrics other than the one currently being considered in order to prevent deterioration in their performance.

The details of determining a charging profile according to the second case are given below with reference to the coordination device COOR.

Advantageously, the optimization module OPT is further adapted to update the charging profile Pr. It is for example adapted to do so during the slot PTr, the update concerning at least part of the remaining portion of the time slot, and advantageously at least all this remaining portion. In practice, this update can be seen as replacing the charging profile currently being used with a new charging profile in which the charging slot PTr covers all or part of the remainder of the charging time slot PTr of the previously used charging profile, and optionally extends beyond.

This update is for example implemented on command, for example received from the regulation module or the coordination device.

Alternatively, the optimization module OPT itself triggers this update.

Advantageously, this update is implemented in response to detecting that one or more of the conditions described below have been satisfied.

For the update as such, the optimization module OPT is configured to update the data used to construct the initial charging profile, and to determine the updated profile from these updated data.

For example, the optimization module OPT is configured to update the consumption predictions used to construct the previously employed charging profile, for example based on measurement data DM received since the beginning of the time slot PTr. Advantageously, when the electrical energy requirement of the vehicle is used, the module is configured to update this, for example taking into account a partial satisfying of this requirement via the electrical energy already supplied to the vehicle VE during the slot PTr.

Note that this update may result from the coordination device triggering a coordinated optimization step described below and involving the charging device, this triggering forming for example the condition used above. The updated profile then corresponds to a profile constructed according to the second case.

When updating of the profile is triggered at the request of the charging device, this is advantageously implemented on the sole basis of local information, in other words information independent of the other charging devices and of the coordination device as well as of the grid R, regardless of the case in which the charging profile currently being used was determined (first case or second case). In other words, it then corresponds to a charging profile constructed according to the first case. However, this construction advantageously takes into account at least a partial satisfying of the electrical energy requirement of the vehicle VE when this element is used to construct the charging profile.

Again with reference to FIG. 2, the regulation module REG is configured to regulate the electric power Pout actually supplied by the device RECH to the vehicle VE during the period PTr. This power Pout is variable over time.

The regulation module REG comprises a first mode of operation in which it is configured to regulate the power Pout in order to match it to the power P1 of the charging profile Pr.

In other words, in this first mode of operation, the regulation module provides a regulated electric power linked to the power P1 determined by the optimization module, which is then the power prescribed for the output from the charging device RECH.

In practice, in this mode of operation, the charging profile Pr currently being considered (and likely to be replaced by another newly constructed one forming an updated profile) is applied.

Note that for reasons relating to the actual operation of the charging device not corresponding to an ideal case, the power Pout may be slightly different from the power P1 then prescribed, in particular at least temporarily during a change in value of the power P1, for example when transitioning from one interval to another.

In addition, the regulation module REG comprises a second mode of operation in which it is configured to regulate the power Pout in order to match it to a second prescribed power P2. This power P2 is in principle variable over time.

As before, the power Pout may be slightly different from the power P2 due to a non-ideal operation of the charging device.

The power P2 is advantageously determined by the regulation module REG itself, or by another module which then communicates the value of this power over time (which can then be viewed as being part of the regulation module).

Advantageously, the power P2 is constructed as a sum of the power P1 (at the corresponding moment) and of a regulation quantity (which can take negative values) representative of an adjustment to the power P1.

This regulation quantity may in particular be representative of a divergence between the actual status of the facility I and its status as predicted during the construction of the charging profile Pr determined by the optimization module OPT.

In practice, since the value of P1 is known, the processing performed to determine P2 essentially concerns this regulation quantity.

The second mode of operation comprises:
an individual sub-mode of operation, and
a collective sub-mode of operation.

In the context of the individual sub-mode, the regulation quantity is advantageously determined on the basis of local information only, in other words information pertaining only to the facility I considered. In particular, the regulation quantity is independent of the data sent by the coordination device COOR and the other charging devices as well as of the status of the grid at the moments considered. Note that this is particularly true for the data considered apart from the value of P1 at the corresponding moments, which may have been determined on the basis of information provided by the coordination device.

In the context of the collective sub-mode, the regulation quantity is advantageously determined at least on the basis of information from the coordination device COOR, and advantageously also on the basis of local information, for example of the same nature as that used in the context of the individual sub-mode of operation.

In the context of the individual sub-mode of operation, the power P2 is advantageously determined on the basis of the maximum electric power Pmax. In addition, it is determined on the basis of the measurement data DM supplied by the metering device COMP to device RECH concerning the electric power drawn by the equipment items EQi, and more specifically from data defining the curve CONSO of power drawn by the equipment items EQi connected to the point of delivery PDL concerned.

Advantageously, these measurement data are processed by the regulation module REG in order to construct a short-term prediction of the power that the equipment items EQi are expected to draw at the point of delivery PDL. For example, "short-term" means that this prediction relates to the expected consumption for some or all of the set of future intervals within at least a predetermined number s of intervals of the current interval, for example about 10 intervals. This horizon is for example 10, 20, or even 30 intervals. In other words, this prediction is for one or more future intervals distanced by less than 5 intervals from the current interval. The predictions advantageously relate to a set of consecutive intervals, such as for example the 5, 10, or 15 intervals following the current interval, or following an interval which itself is a future interval within the horizon considered.

The details of determining these predictions are for example known.

The second power P2 (at least in individual sub-mode) is further determined as a function of power P1, in other words of the charging profile determined by the optimization module.

Advantageously, the second power P2 (at least in individual sub-mode) is further determined from at least one of the following:
the electrotechnical behavior of the protection device PROT of the point of delivery PDL,
a charging constraint of the electric vehicle, representative of at least one range of electric power values Pout which is excluded,
a maximum number of times that the charging of the electric vehicle can be stopped by the charging device RECH during the charging time slot, in other words occurrences of situations in which P2 is zero.

An element that may also be taken into account is the power capacity of the charging device RECH, in other words a maximum power that the charging device RECH is rated to deliver.

As before, the electrotechnical behavior of device PROT is representative of its response to events occurring in the electrical component of the facility and at the point of delivery, in particular the total power drawn at the point of delivery PDL exceeding the power Pmax.

In practice, this behavior is taken into account in the form of a model, for example defined by one or more rules. One of these rules concerns for example the fact that exceeding the power Pmax can be allowed to occur but then cannot exceed a certain value and must not remain true for a period of more than a predetermined duration. For example, these rules come in the form of one or more nomograms.

Thus, for example, the power P2 is constructed according to this or these rules, of which at least one incorporates one or more conditions relating to the exceeding of Pmax.

Alternatively, it should be noted that the consideration of Pmax can be implemented as an upper limit of the power P2 which must not be exceeded, even for a very short time.

As previously indicated, the exclusion of ranges of values of Pout and the maximum number of times that charging is stopped constitute conditions relating to the charging of the vehicle under conditions that do not result in damage to it.

For example, for the individual sub-mode, the approach adopted for determining the regulation quantity for the determination of P2 for the different intervals is based on a heuristic approach.

For example, in the context of this approach, the value of the regulation quantity for a given time interval is chosen from a plurality of discrete values respectively associated with a status of the local components of the system among several possible statuses. These components include the point of delivery PDL, the charging device RECH, the electric vehicle VE, and the electrical equipment items EQi associated with the point of delivery PDL connecting the charging device RECH concerned.

The values considered may for example be determined at least from P1.

This status of the system (i.e. of its local components) is determined from the elements considered for the determination of P2. The elements selected are for example successively analyzed, each element resulting in the selection of one or more values among a plurality of possible values, so that only one value is selected. For example, the analysis of at least one element is adapted to result in selecting a single value for the regulation quantity, at least for the last element analyzed. Elements other than the last one may result in the selection of a single value, thereby interrupting the element analysis sequence.

Note that for a given element, the possible values from which the selected value or values are chosen are for example defined on the basis of the result from the analysis of the preceding criterion or criteria. In other words, the second criterion analyzed can lead to retaining different possible values (from which the selection is subsequently made) depending on the result of the analysis of the previous criterion, the third taking into account the first and/or second, and so on for the different elements analyzed.

For example, in the case of short-term predictions, if it is determined for a time interval (a future one relative to the current interval) that the deviation between Pmax and the consumption predictions is lower than a threshold value, the retained value for the regulation quantity is chosen so that the power P2 is zero or minimal.

Note that some values may be excluded as time passes, for example after their selection a predetermined number of times during some or all of the past time intervals.

In the context of the collective sub-mode of operation, the power P2 is determined at least from status data of the electric power supply grid determined by the coordination device from measurements representative of a status of the grid which are made during a time interval preceding said given moment. Note that the status data of the grid may be a prediction of the grid status determined from the measurements considered. The status taken into account corresponds for example to a value of a quantity associated with an element or a set of elements (defining for example a region of the grid), as described above, relative to the corresponding capacity.

The adopted approach is for example similar to the one used for the determination of P2 in the individual sub-mode, except that it involves the coordination device. This determination is detailed below.

The regulation module REG is adapted to switch between the first mode of operation and the second mode of operation. In addition, it is adapted to switch between the two sub-modes of operation of the second mode of operation.

Advantageously, the switching is performed in response to at least one condition being satisfied.

The condition or conditions used depend for example on the direction in which the switch is performed, as well as to which sub-mode the module REG switches to when it switches to the second mode of operation.

For switching to the collective sub-mode, only one condition is used for example. This condition is for example the receiving by the charging device RECH of a switch command issued by the coordination device COOR.

For switching to the individual sub-mode, at least one condition referred to as the first condition is used.

Advantageously, at least one first condition is defined on the basis of the consumption of the equipment items as provided by the optimization module for the construction of the charging profile Pr, for at least one time interval, and a quantity that is a function of the consumption of the equipment items EQi as measured, advantageously during the charging slot PTr, in other words the power provided by the curve CONSO.

The time interval or intervals considered are future and/or past intervals.

For each past interval, the quantity corresponds directly to the consumption (i.e. the electric power) of the equipment items as measured for the interval considered. Thus, for this interval, the consumption prediction for the equipment items EQi and their consumption as measured are taken into account.

For each future interval, the quantity is also a prediction of the consumption of the equipment items EQi for this interval. This prediction is for example constructed at least from recent measurement data DM, for example relating to one or more intervals separated from the interval considered by a predetermined maximum duration (which for example is expressed by taking into account the last k data received from the point of delivery PDL relating to the consumption of the equipment items EQi). The procedures for this first prediction are for example those implemented in the second mode of operation, and correspond to short-term predictions.

Advantageously, the condition targets the difference between the consumption predicted by the optimization module and the consumption as measured or predicted from more recent consumption data, in particular obtained from measurements made during the charging time period PTr.

Advantageously, the condition is constructed to be satisfied if a quantity representative of the observed deviation is greater than a threshold value for a predetermined number of consecutive intervals (for example greater than or equal to 1) associated with this condition.

In practice, the analyzed quantity (which optionally corresponds to an absolute value) may correspond to the conventional difference. However, other methods of calculation may be envisaged; difference is only one possible exemplary operation.

Note that this condition may be taken as the only condition for the switch.

Advantageously, at least one of the first conditions is defined on the basis of the comparison between the maximum electric power Pmax and a quantity representative of a total electric power to be supplied by said point of delivery for the charging device and said other equipment items during said charging time slot.

In other words, this quantity is defined from the total power requested or likely to be requested by the equipment items EQi and the charging device during one or more time intervals of the slot PTr.

The quantity has a given value during a given interval. In other words, it represents the electric power drawn or intended to be drawn by the device RECH and the equipment items for each moment in this interval.

The quantity considered is for example associated with a past time interval. In this configuration, the quantity is constructed from consumption measurement data DM for the equipment items, as well as the history of the supplied power Pout (which for example is stored in memory during the operation of the charging device RECH). Alternatively, the value (or values) of P2 for the interval considered is taken into account.

Alternatively, the quantity considered is associated with a future interval. In this configuration, the quantity is constructed from consumption predictions for the equipment items EQi associated with the corresponding point of delivery PDL, for example those generated by the optimization module OPT or by the regulation module REG. In addition, the electric power associated with the device RECH corresponds to the value of P1 provided by the charging profile for that moment.

In practice, the quantity is for example constructed to correspond to the sum of the consumption of the equipment items (EQi) (predicted or actual) and of the charging device (respectively predicted, actual) for the associated interval.

The comparison corresponds for example to a difference between Pmax and the cumulative power consumption by the equipment items EQi and the charging device RECH.

Advantageously, the condition is constructed from the value of this quantity for different consecutive intervals. In addition, it is constructed so that it is satisfied if the value of this quantity exceeds the maximum power Pmax for a predetermined number of consecutive intervals. In other words, the condition is detected as satisfied if it is satisfied for a selected number of consecutive intervals.

Advantageously, the intervals considered are future intervals, so that the device RECH thus evaluates the future status of the point of delivery PDL and anticipates potentially problematic events.

This number of intervals is advantageously predetermined based on the operation of the protection device PROT, and corresponds to or approaches for example the maximum amount of time that this device can tolerate the exceeding of Pmax without stopping the drawing of power at the point of delivery.

Alternatively, this number is equal to one (only one interval then being considered).

To trigger the switch from the second mode of operation to the first mode of operation of the regulation module, advantageously at least one condition called the second condition is used.

Advantageously, at least one second condition is defined on the basis of the comparison between the maximum electric power of the point of delivery and a second quantity representative of a total electric power to be supplied by the point of delivery for the charging device and said other equipment items.

This second quantity is for example identical to the quantity used for the switch from the first mode of operation to the individual sub-mode of the second mode of operation (the considered values of this quantity being in principle associated with other intervals).

The second condition is for example constructed so as to be satisfied if the difference between the power Pmax and the value of this second quantity is less than a predetermined value during one or more intervals. Preferably, the intervals considered are future intervals.

Alternatively or in parallel, the or a second condition taken into account is defined on the basis of the consumption of the equipment items EQi as measured, in other words the power supplied by the curve CONSO, and the consumption of the equipment items as predicted by the optimization module for the construction of the charging profile, for at least one time interval.

For example, this condition is close to the first condition described above. For example it is identical, except that it is considered to be satisfied when the quantity representative of the deviation between the prediction PC and the consumption as measured (for past intervals) or the prediction constructed from measurements (for future intervals) is less than a predetermined threshold value over the interval or intervals selected for this condition. This threshold value may be different from the one used in the first condition. The second condition may also differ in the number of intervals taken into account.

Again with reference to FIG. 2, the learning module MA is configured to generate the training data DA. These data are advantageously used in the context of the operation of the optimization module OPT, and/or the operation of the regulation module REG.

Advantageously, the training data DA comprise prediction training data.

These prediction training data are intended to improve the predictions made by the optimization module and/or the regulation module on the basis of the operation of the charging device RECH over time. These data are for example generated from statistical data concerning the modes of operation of the regulation module, the switching between these modes, the supplied power Pout, the charging requirement data collected from the vehicle, the connection times of the vehicle, and/or the consumption predictions previously made.

Advantageously, these data include prediction parameterization data used for the determination of consumption predictions determined by the charging device RECH in general, regardless of the prediction method used, for example a GAM type method, an expert aggregation method, or a Deep Learning type of learning method.

Advantageously, the training data also comprise optimization training data intended to refine the procedures for determining the charging profile Pr over time from the data used.

These data advantageously include resolution parameterization data, which for example include values for the weighting factors for the submetrics used in constructing the charging profile. These values are adjusted over time. As before, these adjustments are advantageously carried out on the basis of the data collected during the operation of the charging device RECH.

The training data advantageously include regulation training data configured to refine the operation of the regulation module, in particular the second mode of operation, over time.

These data include, for example, regulation parameterization data defining one or more rules relating to determining the regulation quantity. These regulation parameterization data affect, for example, the values resulting from the analysis of some or all of the selected elements, the order of analysis of the selected elements, and/or the nature of the selected elements.

As before, these data are advantageously constructed on the basis of data collected during the operation of the device RECH.

The training data are for example constructed by the learning module on the basis of learning rules that define the configuration of the learning module.

These learning rules are based, for example, on a method for evaluating the decisions made by the components of the charging device RECH (in particular the modules OPT and REG). The evaluation of a decision, for example such as the construction of a given charging profile or the determination of a value for the regulation quantity, is based for example on the comparison between this decision and at least one simulation of this decision made with one or more other elements of the decision having been modified (for example, for the determination of the regulation quantity, the nature of an element selected for the determination of P2, the order of the elements, and/or the values selected for the analysis of each element). This comparison is configured to result in an evaluation of the decision made, for example via one or more quantified indicators, and an adjustment of the training data on the basis of the evaluations made.

In practice, these learning rules define the manner in which the different training data are generated from information concerning the operation of the charging device RECH, collected over time, and advantageously the nature and the form of the data coming from the operation of the charging device RECH which are used to generate training data via the learning rules.

As indicated above, these training data are optionally used by the regulation module and the optimization module to carry out their functions. When this is so, they are used for the resolution techniques implemented and/or the techniques for constructing the input data for this resolution. Alternatively, when this is not so, the modules OPT and REG use other values, for example predetermined ones. One will note that modifications can be made to these predetermined values, for example in the form of updates during which the charging devices RECH are updated, for example on site by an operator or remotely.

Advantageously, the charging devices RECH are configured to exchange some or all of their training data with each other. In addition, advantageously, the training data of a given charging device are also constructed on the basis of the training data received from the other charging devices. Advantageously, this incorporation of the training data of other charging devices occurs after a first phase during which the training data are generated solely on the basis of the data collected by the charging device.

In some embodiments, a given charging device receives training data from a strict subset of the system's charging devices RECH (which may be a single charging device). For example, the content of this subset may be defined on the basis of one or more criteria, for example geographical proximity, similarity in terms of respective facilities I, equipment items EQi coupled to the corresponding point of delivery PDL, etc.

The interface IHM comprises for example a display and/or one or more input buttons (possibly combined with the display in the form of a touchscreen). This interface is intended for data entry by the user, for example to enter a selected date and time for the end of the charging time slot and/or for the disconnection of the vehicle, as well as for displaying information intended for the user, such as information relating to charging the vehicle, in particular the end of charging time, the corresponding charge status, etc.

The coordination device COOR is configured to coordinate the operation of the system's charging devices RECH.

For this purpose, it is configured to communicate with the different charging devices, and advantageously to do so bidirectionally. In addition, it is configured to communicate with the points of delivery, particularly the metering devices COMP, in order to obtain power consumption measurements relating to the system SYS at the grid level, at least for the portion of the grid connected to the points of delivery PDL serving the charging devices RECH of the system SYS.

At least two approaches are possible for the general configuration of the coordination device COOR.

In a centralized approach, illustrated in FIG. 1, the coordination device COOR is an autonomous device positioned at a location in the system SYS.

In a distributed approach, the coordination device COOR comprises a plurality of coordination modules respectively arranged at, near, or within one of the charging devices RECH. Advantageously, each charging device RECH of the system is then coupled with a coordination module. In the context of this approach, each coordination module is adapted to communicate with the other charging devices RECH besides the one to which it is coupled.

The following description is made with reference to the centralized approach, with elements for transposing this to the distributed approach also being provided.

The coordination device COOR comprises a memory M and one or more processors PROC configured to execute programs contained in the memory M to enable the coordination device COOR to function properly, as well as a communication interface for communicating with the other elements of the system SYS and the points of delivery PDL.

The coordination device COOR is configured to trigger a collective optimization phase involving some or all of the charging devices RECH, and aiming to construct, for each charging device RECH involved, a charging profile Pr that takes the other charging devices RECH into account. In other words, this phase aims to construct charging profiles PR built according to the second case by the charging devices RECH.

Several approaches are possible concerning the charging devices RECH involved.

In one case, all charging devices RECH are involved. This is reflected in particular by updating the profiles Pr of the charging devices having a current charging profile.

In another case, only the charging devices that are currently charging an electric vehicle are involved.

In another case, only the charging devices RECH having declared themselves as awaiting a coordinated optimization phase are involved. This declaration is for example implemented automatically by the charging devices RECH, for example when an electric vehicle is plugged into them. This declaration is optionally conditional, for example by a preference setting of the user.

These groups of devices RECH may be combined, a coordinated optimization phase involving for example both the devices being charged and those that have declared themselves as awaiting such a phase.

For the purposes of the coordinated optimization phase, the coordination device COOR is configured to generate and send at least one coordination signal SIGNi (where i indexes the charging devices RECH of the system SYS) to at least one charging device RECH. In a centralized approach, it is configured to generate and send such a signal SIGNi to each device RECH.

In a distributed approach, the different coordination modules are configured to generate a signal SIGNi intended for the charging device RECH to which it is coupled, this signal also being supplied to the other coordination modules.

Each coordination signal SIGNi is generated from individual charging data items received from the charging devices involved.

This individual charging data item advantageously corresponds to a charging profile Pr determined by the charging device RECH considered, as detailed below.

Advantageously, the coordinated optimization phase is conducted iteratively. During an initial step, each charging device involved generates a temporary individual charging data item, here a temporary charging profile, preferably according to the first case, in other words from local information only. This temporary charging profile is sent to the coordination device COOR (to each coordination module if applicable). Based on the different charging profiles (generally individual charging data items), the coordination device COOR generates the coordination signals and sends them to the charging devices involved.

In the next step, each charging device updates the temporary charging profile based on the coordination signal received. Once this update is done, each charging device sends a modified individual charging data item to incorporate the update to the charging profile. The coordination device COOR then generates new coordination signals on the basis of the updated individual charging data items.

This step is repeated until a final charging profile is reached for each charging device RECH involved, which is retained as the result of the coordinated optimization phase and which then becomes the current charging profile of the charging device (possibly replacing the previous one).

The iterations advantageously stop in response to at least one condition being satisfied.

One condition for example concerns a predetermined number of iterations comprised in the coordinated optimization phase. Alternatively or in parallel, a condition is constructed to be satisfied when a quantity representative of the stability of the temporary charging profiles of the charging devices is satisfied.

This condition is for example representative of the fact that the temporary charging profiles of some or all of the charging devices involved are not modified or are only slightly modified in at least one new step.

This condition is based for example on the use of one or more metrics whose values are evaluated in each step, the condition being satisfied when this or these metrics have values which satisfy one or more criteria, for example the variation of this or these values from one step to another.

Note that the number of iterations of this phase may vary from one charging device to another. In other words, the charging devices RECH may carry out only some of the steps and exit the coordinated optimization phase independently of the other charging devices. The charging profile resulting from this phase is then for example the one resulting from the last step executed, which for example then only comprises updating the charging profile on the basis of the coordination signal received during the step. Note that the charging profile may be a charging profile obtained during any intermediate step.

In other words, the satisfied conditions can be associated with a strict subset of the charging devices RECH, particularly a subset corresponding to one (or a plurality of) charging devices.

As for the content of the coordination signal SIGNi itself, several embodiments are possible.

In one embodiment, this signal is representative of the sum of some or all of the charging profiles of the charging devices involved (for example transmitted in an encoded form). In other words, the coordination signal sent to a charging device RECH is representative of the sum of the individual charging data items received during the step considered.

In one embodiment, this signal is representative of a status of the power supply grid. More specifically, it is advantageously representative of a status of the grid as estimated for one or more time intervals, comprising at least one future interval. This estimate is determined from the individual charging data items received.

In practice, this estimate concerns the status of the entire grid or only part of the grid, for example a portion of the grid such as the low-voltage portion and/or the medium-voltage portion, via which the charging device RECH considered is connected to the grid of the grid. However, this estimate may integrate a larger portion of the grid than the sole portion connecting the point of delivery PDL associated with the charging device considered to the rest of the grid R.

This estimate comprises, for example, a distribution of the electric power, voltage, electrical intensity, and/or harmonics across the region of the grid R concerned, for example at each node and/or in each segment connecting the nodes of this region. Such distributions are for example known by the name "load flow".

The details of determining such a distribution from the charging profiles of some or all of the charging devices RECH received is for example known.

In some advantageous embodiments, the coordination signal SIGNi is representative of these two elements.

For determining a charging profile according to the second case on the basis of the coordination signal SIGNi, a multi-criteria approach is used in which each objective is associated with a metric, the metrics being weighted by a factor of chosen form and combined with each other (for example linearly) to form an overall metric used as a starting point for solving the problem (for example via a resolution method identical to the one used in the first case).

As for the collective objective(s), the value of the corresponding metric is taken as equal to the content of the coordination signal SIGNi relating to this objective.

In other words, if the impact on the grid of charging the vehicles is used as an objective, the signal SIGNi comprises data representative of the estimated status of the grid (i.e. in the considered region of the grid), these data being taken as the value for the corresponding metric (possibly after an operation to convert it into a quantified amount). If the cumulative power required to charge the vehicles on all (or some) of the charging devices involved is used, the coordination signal comprises the corresponding data taken as the value of the associated metric.

Note that the coordination signal may be different from one charging device to another. In particular, the region considered for one charging device may not be identical to the region considered for another charging device, so their respective signals will not be representative of the status of the same region of the grid and in principle will therefore be different. In addition, the population of charging devices considered when summing the charging profiles may differ from one charging device to another.

The coordinated optimization phase is for example triggered in response to at least one condition being satisfied. For example, this condition concerns the lapse of a predetermined period of time since the last coordinated optimization phase, optionally specifically targeting the charging devices having a particular status (in the process of charging, not charging, declared as awaiting a coordinated optimization phase, etc.). Alternatively or in parallel, a condition concerns reaching a number of charging devices RECH having a predetermined status (a number optionally raised to the number of devices RECH in the system). For example, if 20% or more of the charging devices have declared themselves as waiting for a coordination phase, this is triggered.

In addition to triggering this coordinated optimization phase, the coordination device COOR is adapted to trigger a coordinated regulation phase.

This phase involves a plurality of charging devices RECH. In addition, it involves some or all of the charging devices RECH currently charging a vehicle VE.

During this coordinated regulation phase, the charging devices RECH involved are switched to the collective sub-mode of operation of the second mode of operation in response to the triggering of this phase. This triggering is for example caused by the coordination device COOR, which sends a signal for this purpose to the corresponding charging devices RECH.

The coordination device COOR is for example configured to trigger such a phase in response to at least one condition being satisfied.

Advantageously, at least one condition concerns the status of some or all of the grid R. Advantageously, it relates to the difference between a capacity of a region (forming part of the grid or covering the entire grid), advantageously an electric power capacity across the region in question defining a maximum power value for this region (for example but not necessarily corresponding to the maximum effective power that this region is rated to tolerate), and the sum of the actual or planned electrical consumption for the points of delivery PDL associated with the system SYS and connected to this region of the grid R.

This electric power capacity is for example taken as being the most design-critical power capacity of the node and/or segment of this region, or a combination of several design-critical capacities. These elements are for example available to the coordination device, where they are for example stored in memory.

For example, this difference is quantified for one or more intervals comprising a past and/or future interval, the condition being configured to be satisfied if this difference (or a quantity representative of this state) is less than a predetermined value in the one or more intervals considered. As indicated, the sum of the electric powers can be a prediction made at least on the basis of the consumptions of the various points of delivery PDL in question, as measured, advantageously during recent intervals.

Note that a condition may be associated with a predetermined region of the grid (such as part of the BT or HT portions, or even the entire grid), the satisfying of this condition then defining the charging devices involved in the coordinated regulation phase as being those connected to the region associated with the satisfied condition. The possible different conditions used and respectively associated with different regions of the grid are then all analyzed, for example at regular time intervals.

Note also that coordinated regulation phases can be conducted in parallel. They then respectively involve different charging devices RECH.

In the context of a coordinated regulation phase, the power P2 is determined on the basis of elements chosen among the elements from which one chooses to determine P2 in the context of the individual sub-mode. In addition, it is determined on the basis of the coordination signal SIGNi received by the device RECH considered. In practice, the content of the signal SIGNi is then specific to this mode of operation.

For example, for the determination of P2 in this sub-mode, a heuristic approach is also retained.

For a given interval, an initial power P2 is determined in a manner analogous to how this is done for the individual sub-mode. The initial powers P2 determined by the devices RECH involved are sent to the coordination device, which in return generates a signal SIGNi for each device RECH. The power P2 is adjusted according to the content of the signal SIGNi.

For example, this adjustment is done by selecting from a plurality of possible values of P2 on the basis of the content of the signal. These possible values are for example determined on the basis of the initial value of P2 sent to the coordination device COOR. Optionally, at least one of these values is provided by the coordination device COOR, or all are.

It should be noted that this determination can be carried out on the basis of the regulation quantity instead of P2.

In addition, this determination can be carried out iteratively for one or more intervals, the initial value of P2 being updated and sent to the coordination device COOR at each step until the end of the iterations (for example triggered by a solution stability criterion or a predetermined number of steps that may vary from one considered charging device to another).

Figure 4:
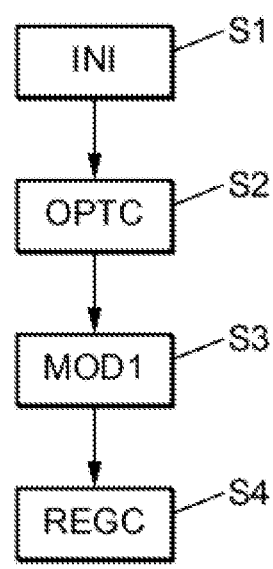
FIG. 4 is a block diagram of an operating method of the system according to an embodiment.

A method for the operation of the system SYS will now be described with reference to the figures, particularly FIG. 4.

During an initial step S1, within the system SYS, some of the charging devices RECH are charging while the others are not. Some of the ones that are not charging have for example declared themselves to the coordination mechanism as waiting for a coordinated optimization phase.

Some of the charging devices RECH have a pre-built charging profile Pr defining the schedule for the electric power that they are expected to supply to an electric vehicle connected to the charging device RECH in order to charge it during the corresponding charging time slot PTr, or that they are already supplying, typically with their regulation module REG operating according to the first mode of operation. Other charging devices RECH, for example those recently activated, do not yet have such a charging profile.

During a step S2, a coordinated optimization phase is triggered by the coordination device, this device targeting some or all of the charging devices RECH. This triggering occurs for example in response to the corresponding condition or conditions being satisfied. The coordinated optimization phase is carried out as described above, and results in the creation of a charging profile Pr for each device RECH involved.

During a step S3, the charging profiles Pr determined in step S2 are applied by the corresponding charging devices RECH, which then operate according to the first mode of operation or according to the individual sub-mode of the second mode of operation (possibly after switching). For this purpose, the power Pout is regulated by the regulation modules to correspond to the power P1 defined by the previously determined charging profile, respectively the power P2 determined from the power P1 of the newly determined charging profile.

During a step S4, the coordination device COOR triggers a coordinated regulation phase involving some or all of the charging devices RECH.

The corresponding devices then operate according to the collective sub-mode of the second mode of operation (possibly after switching if they were not previously implementing this sub-mode), the corresponding power P2 then being determined as indicated above.

With reference to FIGS. 3A and 3B, which illustrate the operation of the system from the perspective of a given charging device RECH, the charging device RECH whose operation is illustrated is connected to the electric vehicle it is to charge at a given time.

At a later time t0, the charging device RECH is involved in a coordinated optimization phase, which results in a charging profile Pr. This occurs, for example, after the device has declared to the coordination device that it is awaiting such a phase.

At time t_init corresponding to the beginning of the charging time slot PTr, the charging device RECH starts to implement the charging profile in the first mode of operation (for example) and provides a power Pout regulated to correspond to the power P1 of the charging profile (at the corresponding times).

In parallel, it analyzes the conditions for triggering an update of the charging profile, as well as the switch to the second mode of operation, in particular the individual sub-mode. For example, at time t1, these conditions for switching to the individual sub-mode of the second mode are met, for example due to the fact that the difference between the consumption prediction for the equipment items EQi (associated with the corresponding point of delivery PDL) established on the basis of measurements made during the time slot PTr, and the prediction of this consumption established in order to construct the charging profile, becomes greater than the associated predetermined value.

Once in this individual sub-mode, it delivers the power Pout regulated to correspond to the power P2 whose value is determined according to the procedures of this sub-mode. In addition, it analyzes the conditions for switching to the first mode of operation. These conditions are for example met at time t2, here for example because the difference between the consumption prediction for the equipment items EQi determined on the basis of recent measurement data DM, and the predictions of this consumption used to construct the charging profile, becomes less than the threshold value used to trigger this switch.

It then returns to the first mode of operation, where it delivers power Pout regulated to correspond to the power P1.

At time t3, the coordination device COOR detects that the conditions for triggering a coordinated regulation phase are met (or the condition if only one is used). Here, the condition concerns the fact that the difference between the permissible electric power capacity in a region of the grid denoted r(R), advantageously connecting the device RECH to the rest of the grid R, and the cumulative consumption of the charging devices RECH and equipment items EQi connected to this region r(R), becomes less than a threshold value, and does so in the interval or intervals considered (possibly future, in which case the cumulative power is predictive). This power capacity is denoted P(r) in FIG. 3B, the above cumulative power being denoted $P_{\Sigma,r(R)}$.

The devices RECH involved, comprising the illustrated charging device RECH, then switch to the collective sub-mode of the second mode of operation, where they deliver a power Pout regulated to correspond to P2, its value determined according to the approaches of this sub-mode.

In parallel with this, the charging device RECH monitors the conditions for switching to the first mode, as well as the conditions for triggering an update of the charging profile Pr (which remains involved in the determination of the power P2 forming a setpoint for the power Pout in the second mode of operation, as described above).

For example, one of these conditions for triggering the update of the charging profile Pr is defined on the basis of a deviation between the electrical energy actually supplied to the electric vehicle during the charging time slot up to a given time (or a chosen past time), and the electrical energy corresponding to the electric power supplied in the charging time slot up to the given (or chosen) time as defined by the charging profile Pr before the update.

In other words, this condition relates to a comparison between the total electrical energy actually supplied to the vehicle by the charging device during the time slot PTr (in other words a summation over time of Pout up to the given time) and the cumulative energy that the vehicle would have received during time slot PTr if the charging profile had been applied for the entire elapsed portion of time slot PTr (a summation over time of P1 up to the given time).

If this deviation, which is for example in the form of a difference, is greater than a predetermined threshold, the optimization module is ordered to update the charging profile.

This update is then conducted on the basis of local information only, in other words it does not result from a new coordinated optimization phase (which can however be triggered shortly thereafter or shortly before).

Advantageously, these conditions are tested at each new interval, at least until they have been satisfied.

Advantageously, once these conditions are satisfied and the update is carried out, the analysis of the update conditions is discontinued for a predetermined period of time, corresponding for example to a predetermined number of intervals.

It should be noted that one condition that can be used concerns a change in the pricing indices used by the optimization module for determining the electricity pricing.

For example, if a quantity quantifying a divergence between the old indices and the new indices is greater than a chosen threshold value, the optimization module is called in order to update the charging profile.

This condition may be used alone or in combination with at least one other.

As illustrated in FIG. 3A, the triggering conditions are for example detected as satisfied at time t4. The updating is carried out and results in replacing the values of P1 predicted for future intervals by new values, which from that moment (t5) are used instead of the initial values for these intervals (the ending time of the charging time slot associated with the updated profile has been represented as matching that of the initial charging profile).

The conditions for modifying the operation of the charging device, in particular the regulation module, continue to be analyzed until the charging of the vehicle has ended. The disclosure has several advantages.

Indeed, it allows taking into account phenomena affecting power grids in a very detailed and flexible manner in a context of charging electric vehicles. In addition, this applies to a grid or to a portion of the grid, at a scale that is readily adaptable.

In addition, the various modes of operation of the system allow a wealth of adjustments for the phenomena predominantly taken into consideration in governing the charging of vehicles at a given moment.

In addition it evolves, in that it adjusts its operation by learning from the data it collects.

It should be noted that the deviations mentioned in the above description are, for example, absolute value deviations. In addition, these deviations can be evaluated by means of quantities that represent these deviations. In other words, a deviation can correspond to something other than a difference.

It should be noted that the predictions for the requirements of the optimization module and/or of the regulation module can in practice be constructed by a dedicated prediction module. This module communicates the appropriate predictions to the corresponding module, for example on request.

It should also be noted that the profile Pr can be constructed, in particular according to the first case, by using a population of candidate solutions having submetric values determined for each of them, thereby providing a value for the metric. A selection is then made among the candidate solutions on the basis of the respective values for the metrics of these solutions. For example, each candidate solution corresponds to a given consumption prediction, and/or to given values for the weighting factors.

Moreover, in the case of a distributed configuration of the coordination device COOR, in particular for coordination modules forming part of the charging device RECH to which they are coupled, each corresponding coordination module is advantageously segregated from the rest of the charging device, in particular in terms of access to the data contained in the coordination module. In particular, the coordination module is then configured not to allow access to the data it stores, particularly for the user of the charging device RECH.

It should be noted that these configurations can be used together, the coordination device comprising an isolated component remote from the charging devices RECH, and coordination modules respectively coupled to the charging devices RECH in a strict subset of the charging devices RECH of the system SYS.

It should further be noted that in the context of the above description, each charging device RECH has the above functionalities. Such may not be the case, however.

For example, some devices RECH (or all of them in some implementations) may have only the collective sub-mode. In addition, they may be configured only to implement the charging profiles that come from a coordinated optimization phase. In addition, the different charging devices RECH may have different configuration procedures. For example, the conditions applied for switching between modes of operation of the regulation module may differ, typically in the population of conditions applied, the threshold values used, etc.

The invention claimed is:

1. A charging system for charging electric vehicles, the charging system comprising:
    a plurality of charging devices respectively adapted to supply regulated electric power in order to charge at least one electric vehicle with electrical energy, the charging devices being intended to be connected to an electric power supply grid, each charging device being intended to be connected to said grid via a point of delivery from which the charging device is configured to draw electrical energy in order to supply said regulated electric power, wherein the totality of the electrical energy supplied by each charging device is drawn from the point of delivery, and wherein each charging device is configured to communicate with the point of delivery and to exchange data with the point of delivery, each charging device comprising:
    an optimization module configured to construct a charging profile associated with a charging time slot and representative of a first charging power suitable for being supplied by the charging device during said charging time slot in order to charge the electric vehicle, and
    a regulation module for regulating the electric power supplied by the charging device, the regulation module comprising:

a first mode of operation in which the regulation module is configured to regulate the electric power that is output in order to match said electric power to the first charging power during at least a portion of the associated charging time slot, and a second mode of operation in which it is configured to regulate the electric power that is output in order to match it to a second charging power, a coordination device for communicating with the charging devices, the coordination device being suitable for:

triggering a coordinated optimization phase involving a group of charging devices comprising some or all of the charging devices of said charging system and during which each charging device involved constructs the charging profile intended to be implemented in the first mode of operation at least based on an individual charging data item generated by the corresponding optimization module at least from predictions of power consumption of other electrical equipment items connected to the corresponding point of delivery for the charging time slot, the electrical equipment items being configured to draw electrical energy from the grid via the corresponding point of delivery, wherein the predictions define an expected behavior of the electrical equipment items to draw electrical energy at the corresponding point of delivery, and on a coordination signal generated by the coordination device from individual charging data items generated by some or all of the charging devices involved, and triggering, at a given moment, a coordinated regulation phase involving some or all of the charging devices of the charging system, during which the regulation module of each of said charging devices involved in the coordinated regulation phase implements the second mode of operation, the corresponding second charging power being determined at least from status data of the electric power supply grid determined by the coordination device from measurements, representative of a grid status, made during at least one time interval preceding said given moment, wherein, during the coordinated regulation phase, the charging devices involved are configured to implement a collective sub-mode of operation of the second mode of operation, the second mode of operation of the regulation module of each charging device further having an individual sub-mode of operation in which the second charging power is determined independently of said status data of the electric power supply grid determined by the coordination device from measurements, representative of a status of the grid, made during the at least one time interval preceding said given moment, wherein the regulation module is adapted to switch between the two sub-modes of operation in response to at least one condition being satisfied.

2. The charging system according to claim 1, wherein, in the individual sub-mode of operation, the regulation module is configured to determine the second charging power at least as a function of: power consumption data of other electrical equipment items connected to the corresponding point of delivery, measured during said charging time slot; and the first charging power of the charging profile.

3. The charging system according to claim 1, wherein, for the charging devices involved in the coordinated optimization phase and having the charging profile in which the charging time slot includes a start time of the coordinated optimization phase, the charging profile determined during the coordinated optimization phase replaces said charging profile once it is determined.

4. The charging system according to claim 1, wherein the optimization module of a charging device is configured to determine the individual charging data item additionally at least from one among the following:

a charging behavior of an electrical energy storage device of the electric vehicle that the charging device is intended to charge, an electrical energy requirement of the electrical energy storage device of the electric vehicle, for charging said electrical energy storage device, an electricity pricing representative of a cost of the electrical energy to be supplied to the electrical energy storage device in order to charge it, an electrotechnical behavior of an electrical protection device of the associated point of delivery, a maximum electric power that the charging device is rated to deliver.

5. The charging system according to claim 1, wherein the coordination device is configured to generate the coordination signal at least from an estimate of the impact on the power grid of the individual charging data items of the charging devices involved in the coordinated optimization phase.

6. The charging system according to claim 1, wherein the coordination device is configured to generate the coordination signal at least from the sum of the individual charging data items.

7. The charging system according to claim 1, wherein each individual charging data item is representative of the charging profile defining values of the first charging power over a charging time slot.

8. The charging system according to claim 1, wherein the coordination device is configured to trigger the coordinated regulation phase in response to at least one condition being satisfied of which at least one condition concerns a comparison between a capacity of a region of the electric power supply grid covering some or all of said power grid and a power consumption generated by the charging devices and the other electrical equipment items connected to said region.

9. The charging system according to claim 8, wherein the charging devices intended to be involved in said coordinated regulation phase are those connected to said region.

10. The charging system according to claim 1, wherein the coordination device is in the form of a device that is remote from the charging devices.

11. The charging system according to claim 1, wherein the coordination device comprises a plurality of coordination modules respectively coupled to one of the charging devices of the charging system, each coordination module being configured to communicate with the other charging devices of the charging system and to supply the coordination signal to the charging device with which it is associated.

12. A method for charging a plurality of electric vehicles, the method being implemented by a charging system comprising:

a plurality of charging devices respectively adapted to supply regulated electric power in order to charge at least one electric vehicle with electrical energy, the charging devices being intended to be connected to an electric power supply grid, each charging device being intended to be connected to said grid via a point of delivery from which the charging device is configured to draw electrical energy in order to supply said regulated electric power, wherein the totality of the electrical energy supplied by each charging device is drawn from the point of delivery, and wherein each charging device is configured to communicate with the point of delivery and to exchange data with the point of delivery, each charging device comprising:
an optimization module configured to construct the charging profile associated with a charging time slot and representative of a first charging power suitable for being supplied by the charging device during said charging time slot in order to charge the electric vehicle, and
a regulation module for regulating the electric power supplied by the charging device, the regulation module comprising:
a first mode of operation in which the regulation module is configured to regulate the electric power that is output in order to match said electric power to the first charging power during at least a portion of the associated charging time slot, and
a second mode of operation in which it is configured to regulate the electric power that is output in order to match it to a second charging power,
a coordination device for communicating with the charging devices, the method comprising:
performing a coordinated optimization phase involving a group of charging devices comprising some or all of the charging devices of said charging system and during which each charging device involved constructs the charging profile intended to be implemented in the first mode of operation at least based on an individual charging data item generated by the corresponding optimization module at least from predictions of power consumption of other electrical equipment items connected to the corresponding point of delivery for the charging time slot, the electrical equipment items being configured to draw electrical energy from the grid via the corresponding point of delivery, wherein the predictions define an expected behavior of the electrical equipment items to draw electrical energy at the corresponding point of delivery, and on a coordination signal generated by the coordination device from individual charging data items generated by some or all of the charging devices involved, and
performing, at a given moment, a coordinated regulation phase involving some or all of the charging devices of the charging system, during which the regulation module of each of said charging devices involved in the coordinated regulation phase implements the second mode of operation, the corresponding second charging power being determined at least from status data of the electric power supply grid determined by the coordination device from measurements, representative of a grid status, made during at least one time interval preceding said given moment,
wherein, during the coordinated regulation phase, the charging devices involved are configured to implement a collective sub-mode of operation of the second mode of operation, the second mode of operation of the regulation module of each charging device further having an individual sub-mode of operation in which the second charging power is determined independently of said status data of the electric power supply grid determined by the coordination device from measurements, representative of a status of the grid, made during the at least one time interval preceding said given moment,
wherein the regulation module is adapted to switch between the two sub-modes of operation in response to at least one condition being satisfied.

13. A non-transitory computer-readable medium having stored thereon computer-executable instructions for implementing the method according to claim 12 when executed by a processor.

14. A charging system for charging electric vehicles, the charging system comprising:
a plurality of charging devices respectively adapted to supply regulated electric power in order to charge at least one electric vehicle with electrical energy, the charging devices being intended to be connected to an electric power supply grid, each charging device being intended to be connected to said grid via a point of delivery from which the charging device is configured to draw electrical energy in order to supply said regulated electric power, wherein the totality of the electrical energy supplied by each charging device is drawn from the point of delivery, and wherein each charging device is configured to communicate with the point of delivery and to exchange data with the point of delivery, each charging device comprising:
an optimization module configured to construct a charging profile associated with a charging time slot and representative of a first charging power suitable for being supplied by the charging device during said charging time slot in order to charge the electric vehicle, and
a regulation module for regulating the electric power supplied by the charging device, the regulation module comprising:
a first mode of operation in which the regulation module is configured to regulate the electric power that is output in order to match said electric power to the first charging power during at least a portion of the associated charging time slot, and
a second mode of operation in which it is configured to regulate the electric power that is output in order to match it to a second charging power,
a coordination device for communicating with the charging devices, the coordination device being suitable for:
triggering a coordinated optimization phase involving a group of charging devices comprising some or all of the charging devices of said charging system and during which each charging device involved constructs the charging profile intended to be implemented in the first mode of operation at least based on an individual charging data item generated by the corresponding optimization module at least from predictions of power consumption of other electrical equipment items connected to the corresponding point of delivery for the charging time slot, the electrical equipment items being configured to draw electrical energy from the grid via the corresponding point of delivery, wherein the predictions define an expected behavior of the electrical equipment items to draw electrical energy at the corresponding point of delivery, and on a coordination signal generated by the coordination device from individual charging data items generated by some or all of the charging devices involved, and triggering, at a given moment, a coordinated regulation phase involving some or all of the charging devices of the charging system, during which the regulation module of each of said charging devices involved in the coordinated regulation phase implements the second mode of operation, the corresponding second charging power being determined at least from status data of the electric power supply grid determined by the coordination device from measurements, representative of a grid status, made during at least one time interval preceding said given moment, wherein the optimization module is configured to determine the charging profile as an optimal solution of an optimization problem with respect to at least one quantity to be minimized by the optimization problem and at least one condition to be satisfied by the optimal solution.

15. A charging system for charging electric vehicles, the charging system comprising:

a plurality of charging devices respectively adapted to supply regulated electric power in order to charge at least one electric vehicle with electrical energy, the charging devices being intended to be connected to an electric power supply grid, each charging device being intended to be connected to said grid via a point of delivery from which the charging device is configured to draw electrical energy in order to supply said regulated electric power, wherein the totality of the electrical energy supplied by each charging device is drawn from the point of delivery, and wherein each charging device is configured to communicate with the point of delivery and to exchange data with the point of delivery, each charging device comprising:

an optimization module configured to construct a charging profile associated with a charging time slot and representative of a first charging power suitable for being supplied by the charging device during said charging time slot in order to charge the electric vehicle, and a regulation module for regulating the electric power supplied by the charging device, the regulation module comprising:

a first mode of operation in which the regulation module is configured to regulate the electric power that is output in order to match said electric power to the first charging power during at least a portion of the associated charging time slot, and a second mode of operation in which it is configured to regulate the electric power that is output in order to match it to a second charging power, a coordination device for communicating with the charging devices, the coordination device being suitable for:

triggering a coordinated optimization phase involving a group of charging devices comprising some or all of the charging devices of said charging system and during which each charging device involved constructs the charging profile intended to be implemented in the first mode of operation at least based on an individual charging data item generated by the corresponding optimization module at least from predictions of power consumption of other electrical equipment items connected to the corresponding point of delivery for the charging time slot, the electrical equipment items being configured to draw electrical energy from the grid via the corresponding point of delivery, wherein the predictions define an expected behavior of the electrical equipment items to draw electrical energy at the corresponding point of delivery, and on a coordination signal generated by the coordination device from individual charging data items generated by some or all of the charging devices involved, and triggering, at a given moment, a coordinated regulation phase involving some or all of the charging devices of the charging system, during which the regulation module of each of said charging devices involved in the coordinated regulation phase implements the second mode of operation, the corresponding second charging power being determined at least from status data of the electric power supply grid determined by the coordination device from measurements, representative of a grid status, made during at least one time interval preceding said given moment, wherein, for the coordinated optimization phase, each regulation module is configured to generate the charging profile at the end of an iterative process in which each intermediate step comprises generating a temporary individual charging data item, sending said temporary individual charging data item to the coordination device, and receiving a temporary coordination signal generated by the coordination device based on the temporary individual charging data items from the various charging devices involved, the temporary individual charging data item being constructed as an individual charging data item from the previous step updated based on the temporary coordination signal received during the previous step, the charging profile being constructed from the constructed individual charging data item updated based on the coordination signal received during the last step or an intermediate step, the initial step being conducted based on the individual charging data item and the coordination signal.

16. A charging system for charging electric vehicles, the charging system comprising:

a plurality of charging devices respectively adapted to supply regulated electric power in order to charge at least one electric vehicle with electrical energy, the charging devices being intended to be connected to an electric power supply grid, each charging device being intended to be connected to said grid via a point of delivery from which the charging device is configured to draw electrical energy in order to supply said regulated electric power, wherein the totality of the electrical energy supplied by each charging device is drawn from the point of delivery, and wherein each charging device is configured to communicate with the point of delivery and to exchange data with the point of delivery, each charging device comprising:

an optimization module configured to construct a charging profile associated with a charging time slot and representative of a first charging power suitable for being supplied by the charging device during said charging time slot in order to charge the electric vehicle, and a regulation module for regulating the electric power supplied by the charging device, the regulation module comprising:
- a first mode of operation in which the regulation module is configured to regulate the electric power that is output in order to match said electric power to the first charging power during at least a portion of the associated charging time slot, and
- a second mode of operation in which it is configured to regulate the electric power that is output in order to match it to a second charging power,
- a coordination device for communicating with the charging devices, the coordination device being suitable for:
  - triggering a coordinated optimization phase involving a group of charging devices comprising some or all of the charging devices of said charging system and during which each charging device involved constructs the charging profile intended to be implemented in the first mode of operation at least based on an individual charging data item generated by the corresponding optimization module at least from predictions of power consumption of other electrical equipment items connected to the corresponding point of delivery for the charging time slot, the electrical equipment items being configured to draw electrical energy from the grid via the corresponding point of delivery, wherein the predictions define an expected behavior of the electrical equipment items to draw electrical energy at the corresponding point of delivery, and on a coordination signal generated by the coordination device from individual charging data items generated by some or all of the charging devices involved, and
  - triggering, at a given moment, a coordinated regulation phase involving some or all of the charging devices of the charging system, during which the regulation module of each of said charging devices involved in the coordinated regulation phase implements the second mode of operation, the corresponding second charging power being determined at least from status data of the electric power supply grid determined by the coordination device from measurements, representative of a grid status, made during at least one time interval preceding said given moment,
wherein the point of delivery comprises a metering device for measuring the electrical energy and/or electric power drawn at the point of delivery by the equipment items and the charging device,
and wherein the metering device is adapted to categorize the electrical energy and/or electric power drawn at the point of delivery into types of use and to measure the consumption for each of these uses.

* * * * *